United States Patent
Dubois et al.

(10) Patent No.: US 9,821,731 B2
(45) Date of Patent: Nov. 21, 2017

(54) COMPOSITE FLOOR AND MOTOR VEHICLE COMPRISING SUCH A FLOOR

(71) Applicant: FAURECIA BLOC AVANT, Nanterre (FR)

(72) Inventors: Séverine Dubois, Rueil Malmaison (FR); Cyrille Guyon, Nommay (FR)

(73) Assignee: FAURECIA BLOC AVANT, Nanterre (FR)

( * ) Notice: Subject to any disclaimer, the term of this patent is extended or adjusted under 35 U.S.C. 154(b) by 0 days.

(21) Appl. No.: 14/781,613

(22) PCT Filed: Apr. 3, 2014

(86) PCT No.: PCT/EP2014/056720
§ 371 (c)(1),
(2) Date: Oct. 1, 2015

(87) PCT Pub. No.: WO2014/161948
PCT Pub. Date: Oct. 9, 2014

(65) Prior Publication Data
US 2016/0052467 A1    Feb. 25, 2016

(30) Foreign Application Priority Data
Apr. 5, 2013   (FR) ...................................... 13 53092

(51) Int. Cl.
*B60R 13/08*   (2006.01)
*B60K 13/06*   (2006.01)
(Continued)

(52) U.S. Cl.
CPC ............ *B60R 13/083* (2013.01); *B60K 13/04* (2013.01); *B60K 13/06* (2013.01); *B62D 25/20* (2013.01);
(Continued)

(58) Field of Classification Search
CPC ...... B62D 25/20; B62D 21/17; B62D 29/041; B62D 29/043; B29C 70/72; B29C 70/86;
(Continued)

(56) References Cited

U.S. PATENT DOCUMENTS 4,705,716 A * 11/1987 Tang ..................... B29C 70/865
                                                    296/181.2
5,343,973 A *  9/1994 Lanker ................. B62D 61/065
                                                    180/211
(Continued)

FOREIGN PATENT DOCUMENTS

DE    10 2009 008799 A1    9/2010

OTHER PUBLICATIONS

International Search Report dated Jun. 23, 2014 issued in PCT Application No. PCT/EP2014/056720.
IPRP dated Dec. 2, 2013 issued in corresponding French Application No. 1353092.

*Primary Examiner* — Glenn Dayoan
*Assistant Examiner* — Sunsurraye Westbrook
(74) *Attorney, Agent, or Firm* — Troutman Sanders LLP

(57) ABSTRACT

The invention relates to a motor vehicle floor having a lower floor made from a composite material; and an upper floor made from a composite material, extending opposite at least part of the lower floor, the lower and upper floors being connected to one another. The floor includes at least one cavity at least partially delimited by the lower or upper floor and communicating with the exhaust line of the motor vehicle.

11 Claims, 3 Drawing Sheets

(51) Int. Cl.
  *B62D 25/20* (2006.01)
  *B62D 29/04* (2006.01)
  *B60K 13/04* (2006.01)
  *B62D 29/00* (2006.01)

(52) U.S. Cl.
  CPC ......... *B62D 29/001* (2013.01); *B62D 29/043* (2013.01)

(58) Field of Classification Search
  CPC ..... B29C 70/885; B60R 13/083; B60R 13/08; B60R 13/0815; B60R 13/0838; B60R 13/0861; B60R 13/0846; B60R 13/0876
  USPC ............. 180/68.5; 296/193.07, 39.3, 190.08, 296/1.03, 146.5, 24.3, 29
  See application file for complete search history.

(56) References Cited

U.S. PATENT DOCUMENTS

| | | | |
|---|---|---|---|
| 6,039,386 A * | 3/2000 | Hasshi | B62D 25/2036 296/193.07 |
| 6,247,747 B1 * | 6/2001 | Kawanomoto | B60J 5/0498 296/181.3 |
| 7,281,754 B2 * | 10/2007 | Behr | B29C 70/342 264/258 |
| 7,997,368 B2 * | 8/2011 | Takasaki | B60K 1/04 180/68.5 |
| 8,397,853 B2 * | 3/2013 | Stefani | B60L 11/005 180/65.31 |
| 2009/0085378 A1 * | 4/2009 | Borchardt | B60R 13/0815 296/191 |
| 2010/0195959 A1 | 8/2010 | Meidar | |
| 2012/0103714 A1 | 5/2012 | Choi | |

* cited by examiner

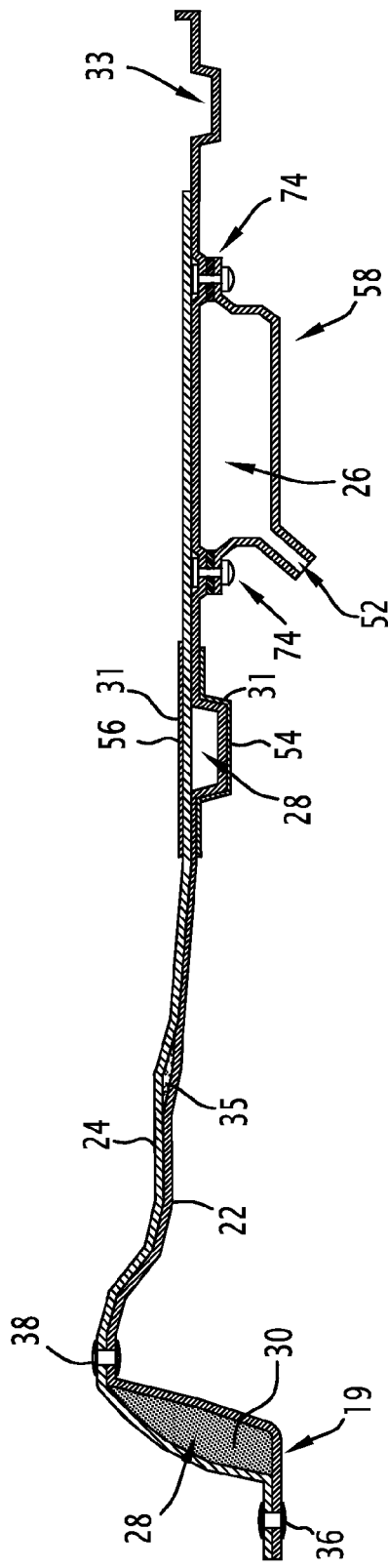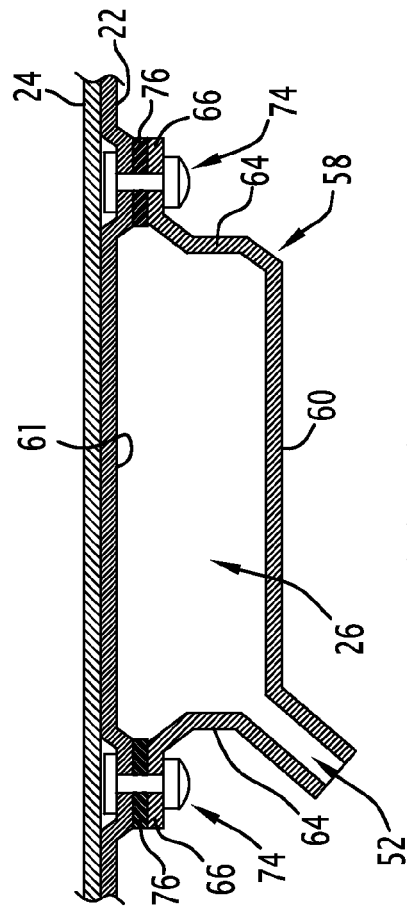

COMPOSITE FLOOR AND MOTOR VEHICLE COMPRISING SUCH A FLOOR

CROSS-REFERENCE TO RELATED APPLICATIONS

This application is the U.S. National Phase of International Patent Application Serial No. PCT/EP2014/056720, filed on Apr. 3, 2014, which claims priority to French Patent Application No. 1353092, filed on Apr. 5, 2013, both of which applications are herein incorporated by reference in their entirety.

FIELD OF THE INVENTION

The invention generally relates to motor vehicle floors.

More specifically, according to a first aspect, the invention relates to a motor vehicle floor, of the type comprising:
a lower floor made from a composite material; and
an upper floor made from a composite material, extending across from at least part of the lower floor, the lower and upper floors being connected to one another.

BACKGROUND OF THE INVENTION

Floors of this type are known, for example from FR 2,912,108. Such floors are light, but are not completely satisfactory in terms of space optimization when functional elements are integrated into the lower and upper floors. Furthermore, floors of this type do not have satisfactory sound insulation.

SUMMARY OF THE INVENTION

In this context, the invention aims to propose a motor vehicle floor allowing optimized integration of functional elements and having optimized soundproofing and that in particular attenuates noise related to the exhaust line of the vehicle.

To that end, the invention relates to a floor of the aforementioned type, characterized in that the floor comprises at least one cavity at least partially delimited by the lower or upper floor and communicating with the exhaust line of the motor vehicle.

Advantageously, the floor comprises one or more cavities delimited by the lower floor and the upper floor. This or these cavities may favorably be used to form an exhaust volume, for example. The space is thus used optimally, and the soundproofing is improved. This or these cavities may favorably be used to integrate an acoustic damping system for exhaust noises, for example a Helmholtz system, here called resonator. The integration of such a resonator-forming cavity in the floor of the vehicle makes it possible to very significantly attenuate noises related to the exhaust line, without increasing the bulk of the floor.

The upper floor is typically turned toward the inside of the passenger compartment of the vehicle. On the contrary, the lower floor is traditionally turned toward the rolling surface of the vehicle.

The composite material forming the upper floor comprises long fibers. Alternatively, it comprises short fibers. The fibers are for example glass fibers and/or carbon fibers and/or aramid fibers and/or natural fibers. These fibers are embedded in a thermoplastic and/or thermoset and/or vitremer resin, for example polyamide, polypropylene, polyester or epoxy.

The composite material of the upper floor has a thickness comprised between 1 mm and 6 mm, and preferably equal to 2 mm.

The composite material of the lower floor is for example identical to the composite material of the upper floor. Alternatively, it is different. It also includes long or short fibers, for example glass fibers and/or carbon fibers and/or aramid fibers and/or natural fibers. These fibers are embedded in a thermoplastic and/or thermoset and/or vitremer resin, for example polyamide, polypropylene, polyester or epoxy. The composite material of the lower floor has a thickness comprised between 1 mm and 6 mm, preferably equal to 2 mm.

The upper floor extends opposite at least part of the lower floor. For example, it extends opposite at least 60% of the surface of the lower floor.

The upper floor and the lower floor are connected to one another, either directly or by means of an external connecting part, for example made from composite material. They are glued, welded or mechanically assembled to one another by one or more fastening members, for example one or more rivets.

In a first alternative embodiment, the cavity is delimited by the lower floor and the upper floor, i.e., all of the walls delimiting the cavity belong to the lower and upper floors.

In this alternative, the cavity makes it possible to significantly decrease the noises related to the exhaust line, but without increasing the bulk of the floor of the vehicle. Furthermore, it makes it possible to avoid the bulk of the floor. Additionally, it does not require additional material for its manufacture, and thereby favors lightening of the vehicle.

According to a second alternative embodiment, the floor comprises a shell, the lower floor comprising a lower face and an upper face, the upper face extending opposite the upper floor, the shell being fastened on the lower face, the cavity being delimited by the lower floor and by the shell. The shell is for example fastened to the lower floor by removable mechanical fastening means, such as screws. In this alternative, the cavity is easy to disassemble, and can thus easily be repaired or exchanged, for example when it is damaged.

In this second alternative, the shell is made from metal. The metal of the shell is for example steel or aluminum. The metal of the shell has a thickness comprised between 0.5 mm and 3 mm, preferably equal to 1.5 mm.

Alternatively, the shell is a plastic having temperature resistance characteristics adapted to an exhaust line.

Alternatively, the shell is made from a composite material. The composite material of the shell is for example identical to the composite material of the lower floor and/or the upper floor. Alternatively, it is different. It includes long fibers or short fibers, for example glass fibers and/or carbon fibers and/or aramid fibers and/or plant fibers. These fibers are embedded in a thermoplastic or thermoset or vitremer resin, for example polyamide, polypropylene, polyester or a proxy. The composite material of the shell has a thickness comprised between 1 mm and 6 mm, and preferably equal to 2 mm.

In order to reduce the temperature of the floor and protect the latter, the cavity for example comprises a thermally insulating inner coating. This is for example a specific surface treatment, or an external attached part acting as a thermal insulator.

In the event the cavity forms a resonator, the cavity further comprises a fluidic communication member between the cavity and the exhaust line of the motor vehicle, for example a tube. Preferably, the cavity includes a single fluid communication member, for example a single tube. The Helmholtz resonator-forming cavity makes it possible to absorb part of the acoustic excitation coming from the exhaust line. This Helmholtz resonance phenomenon favors the acoustic weakening of the noises related to the exhaust line.

Furthermore, the design of the connecting tube is such that there is no permanent flow of exhaust gas from the main line toward the resonator.

The heating of the resonator is therefore limited.

The fluidic communication member is made from a metal, such as steel or aluminum. Alternatively, it is at least partially made from a composite material. The composite material of the fluidic communication member includes long fibers or short fibers, for example glass fibers and/or carbon fibers and/or aramid fibers and/or plant fibers. These fibers are embedded in a thermoplastic or thermoset or vitremer resin, for example polyamide, polypropylene, polyester or a proxy.

The exhaust line being mobile and the cavity formed by the floor being stationary, the fluidic communication member advantageously comprises an uncoupling element able to attenuate vibrations and movements of the exhaust line.

According to one advantageous feature of the invention, the floor further includes at least one hollow body delimited by the lower floor and the upper floor. It is then advantageous to take advantage of the space available in the hollow body, for example to house a soundproofing layer, making it possible to still further improve the soundproofing of the vehicle. Alternatively, the hollow body incorporates other functional elements, such as stiffening profiles, cables, ventilation sheaths, metal anchoring reinforcing inserts, for example for a seat.

According to a second aspect, the invention relates to a motor vehicle comprising:
  a chassis;
  a floor as described above, rigidly fastened to the chassis.

The motor vehicle is for example a car or utility vehicle, or a truck.

The floor is typically a rear floor, which extends between the heel board and the rear crossmember of the vehicle. Alternatively, the floor is a front floor, which extends between the firewall of the vehicle and the heel board. Alternatively, the floor extends between the firewall of the vehicle and the rear crossmember of the vehicle. The firewall is a partition separating the engine compartment of the vehicle from the passenger compartment. The floor is rigidly fastened not only to the longitudinal beams of the vehicle, but also potentially to the firewall, the rear crossmember and/or the heel board.

BRIEF DESCRIPTION OF THE DRAWINGS

Other features and advantages of the invention will emerge from the detailed description thereof provided below, for information and non-limitingly, in reference to the appended figures, in which:

FIG. 3 is a longitudinal sectional view of a floor according to a second embodiment of the invention;

FIG. 4 is a longitudinal sectional view of the cavity of the floor of FIG. 3.

DETAILED DESCRIPTION OF THE INVENTION

In the rest of the description, the longitudinal, transverse, vertical, front and rear directions will be defined in reference to the normal movement direction of the motor vehicle. The vertical direction here is taken to be the perpendicular to the rolling plane of the vehicle.

Figure 1:
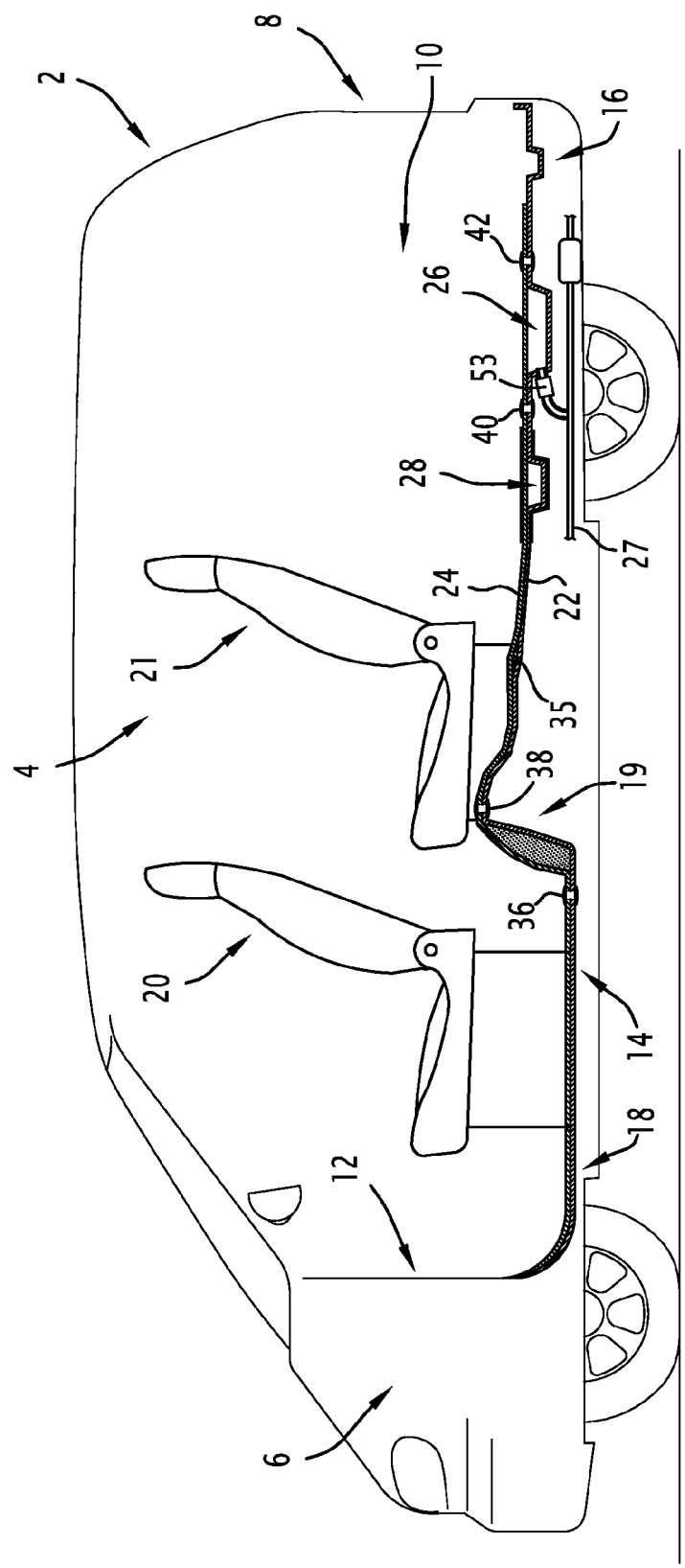
FIG. 1 is a simplified diagrammatic illustration of a motor vehicle including a floor according to a first embodiment of the invention.

The vehicle 2 shown in FIG. 1 comprises a body delimiting, in the vehicle, a passenger compartment 4, an engine compartment 6 situated in front of the passenger compartment, and a rear crossmember 8 delimiting a trunk 10 situated behind the passenger compartment. The engine compartment 6 is separated from the passenger compartment by a firewall 12. The passenger compartment is downwardly delimited by a floor 14. The floor 14 includes a rear floor 16, which will be described below, and a front floor 18. The rear floor 16 and the front floor 18 are connected to one another in a zone 19 situated between a transverse crossmember traditionally called "heel board" and the rear support crossmember of the seats. This connecting zone is commonly called "backseat foot well 2".

The vehicle further includes seats 20, 21 that are rigidly fastened, directly or indirectly, to the floor 14. The front floor 18 is fastened at the front to the firewall 12 and supports the seats 20 situated in the front of the vehicle. The rear floor 16 is fastened at the rear to the rear crossmember 8, and supports the seats 21 situated in the back of the vehicle, and the trunk 10.

The floor 14 of the vehicle extends from the firewall 12 to the rear crossmember 8 in the longitudinal direction of the vehicle, and extends transversely substantially over the entire width of the vehicle. It is laterally rigidly fastened on the chassis (not shown), more specifically on the side beams of the vehicle 2.

Figure 2:
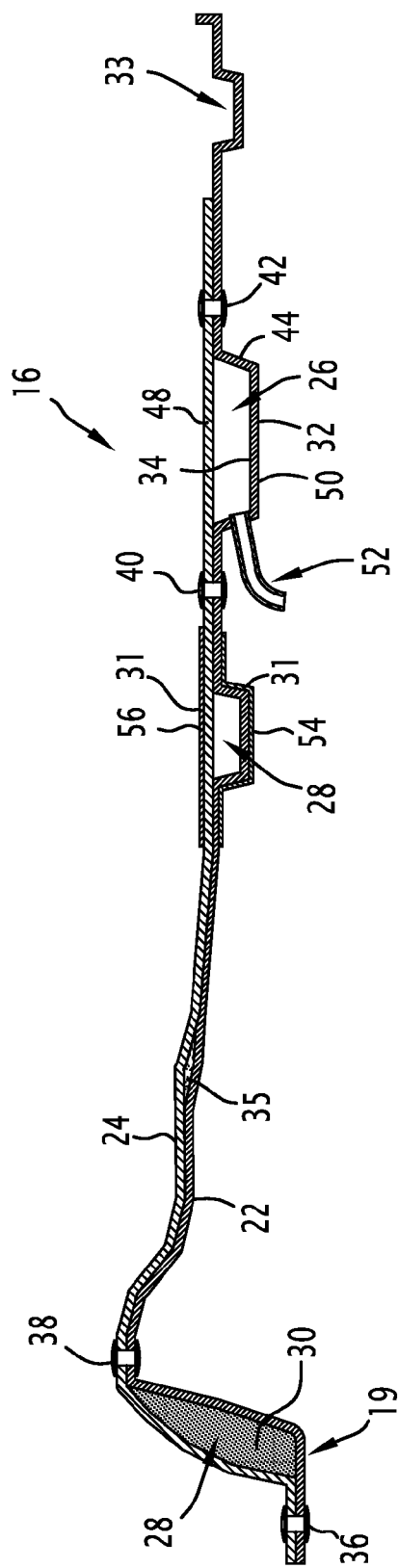
FIG. 2 is a longitudinal sectional view of the floor of FIG. 1.

FIGS. 2 and 3 show the rear floor 16 of the floor 14 according to the invention. The rear floor 16 comprises:
  a lower floor 22 made from a composite material;
  an upper floor 24 made from a composite material, extending opposite from at least part of the lower floor 22;
  a cavity 26 communicating with the exhaust line 27 of the vehicle and at least partially delimited by the lower floor 22; and
  optionally, a hollow body 28 comprising a separate layer 30 and/or a layer of structural foam 35.

The rear floor 16 further comprises mechanical reinforcements 31, and optionally a housing 33 for example for a repair kit or battery (not shown), delimited by the lower floor 22.

The lower floor 22 comprises a lower face 32 and an upper face 34. The upper face 34 extends opposite the upper floor 24, and the lower face 32 faces the rolling surface of the vehicle. The lower face 32 defines an outer surface of the vehicle, exposed to the atmosphere.

The upper floor 24 extends longitudinally over part of the lower floor 22. For example, the upper floor 24 faces 60% of the surface of the lower floor 22.

The lower floor 22 and the upper floor 24 are assembled to one another by gluing and/or welding and/or any other mechanical fastening means.

Alternatively, or in addition to the layer of glue, the lower and upper floors 22, 24 are rigidly fastened to one another by a plurality of fastening members 36, 38, 40, 42, such as self-tapping rivets, as shown in FIG. 2, and/or by a continuous or discontinuous weld line. The fastening members 36, 38, 40, 42 are regularly distributed along the rear floor 16.

Only four fastening members 36, 38, 40, 42 are shown in FIG. 2, but alternatively, the rear floor 16 comprises other fastening members that are not shown.

The cavity 26 is delimited by the lower floor 22 and the upper floor 24. More specifically, the cavity 26 is delimited by a peripheral wall 44, an upper wall 48 and a bottom wall 50. The peripheral wall 44 and the bottom wall 50 are formed in the lower floor 22. The upper wall 48 is formed in the upper floor 24. Advantageously, fastening members, for example two fastening members 40, 42, are distributed around the cavity 26 so as to rigidly keep the lower 22 and upper 24 floors attached near the cavity 26. A seal (not shown) is inserted between the lower 22 and upper 24 floors around the cavity 26 to create tightness.

The cavity 26 comprises a single communication tube 52. In the example shown in the figures, the communication tube 52 extends substantially in the plane formed by the vertical and longitudinal directions. The tube 52 is attached to the cavity 26 and is glued or welded, for example, to the bottom wall 50 and the peripheral wall 44. Alternatively, the tube 52 is integral with the bottom of 50 and the peripheral wall 44. It connects the cavity 26 to the exhaust line 27 of the vehicle. The tube advantageously comprises an uncoupling element 53 visible in FIG. 1. The uncoupling element 53 makes it possible to attenuate vibrations and movements of the exhaust line 27.

The hollow body 28 is delimited by the lower floor 22 and the upper floor 24. The hollow body 28 for example comprises a soundproofing layer 30. The soundproofing layer completely occupies the inner volume of the hollow body 28. Alternatively, the sound proofing layer 30 occupies only part of the inner volume of the hollow body 28.

Alternatively, the hollow body 28 comprises a semi-structural or structural foam 35, such as a polyamide (PA) foam, a polyethylene terephthalate (PET) foam, an expanded polypropylene (EPP) foam, or a polymethacrylimide (PMI) foam.

The mechanical reinforcements 31 extend along the lower and upper floors 22, 24. For example and as shown in FIG. 2, a first mechanical reinforcement 54 includes a first reinforcing plate 54 that extends along part of the lower floor 22 and that mates with the shape thereof. The first reinforcing plate 54 for example has an Ω shape. The first reinforcing plate 54 is for example glued or welded below the lower floor 22. Alternatively (not shown), the first mechanical reinforcement 54 is integrated into the lower floor 22 and is formed by an overthickness of the lower floor 22.

As shown in FIG. 2, a second mechanical reinforcement 56 includes a second reinforcing plate 56 that extends along part of the upper floor 24 and that mats with the shape thereof. The second reinforcing plate 56 is for example glued or welded to the upper floor 24. Alternatively (not shown), the second mechanical reinforcement 56 is integrated into the lower floor 24 and is formed by an overthickness of the lower floor 22.

The first and second mechanical reinforcements 54, 56 extend opposite one another, for example around parts of the lower 22 and upper 24 floors delimiting the hollow body 28. The first reinforcing plate 54 extends along the lower floor 22, and the second reinforcing plate 56 extends along the upper floor 24, opposite the first reinforcing plate 54. Only two mechanical reinforcements 31 are shown in FIG. 2, but alternatively, the rear floor 16 comprises other mechanical reinforcements that are not shown.

A second embodiment will now be described, in reference to FIGS. 3 and 4. Only the points by which the second embodiment of the invention differs from the first will be outlined below. Identical elements, or elements performing the same function, will be designated using the same references in both embodiments.

In the second embodiment, the cavity 26 is formed by the lower floor 22 and by a shell 58.

The shell 58 is fastened on the lower face 32 of the lower floor 22. The shell 58 is in the form of a cup open toward the lower face 32 of the lower floor 22. The shell 58 includes a bottom partition 60, an upper partition 61 formed by the lower floor 22, and a side partition 64. The bottom partition 60 and the side partition 64 are formed by the shell 58. The bottom partition 60 extends substantially parallel to and away from the upper partition 61 formed by the lower floor 24. The shell 58 further comprises an outer collar 66 that radially extends the side partition 64 toward the outside of the shell 58. The outer collar 66 extends in a direction parallel to the bottom partition 60.

The collar is rigidly fastened to the lower floor 22. It is fastened to the lower floor 22 by means of one or more removable mechanical fastening part(s) 74, for example by means of a screw-nut assembly 74 and optionally a seal 76, as shown in FIG. 3.

In an alternative of the second embodiment (not shown), the cavity 26 is formed by the upper floor 24 and the shell 58.

The invention claimed is:

1. A motor vehicle floor, comprising:
   a lower floor made from a composite material, the composite material comprising fibers embedded in a resin; and
   an upper floor made from a composite material, the composite material comprising fibers embedded in a resin, extending opposite at least part of the lower floor, and the lower and upper floors being connected to one another,
   wherein the floor comprises at least one cavity at least partially delimited by the lower or upper floor and fluidly communicating with an exhaust line of the motor vehicle.

2. The floor according to claim 1, wherein the cavity is a resonator-forming cavity.

3. The floor according to claim 1, further comprising at least one hollow body delimited by the lower floor and the upper floor.

4. The floor according to claim 3, wherein the at least one hollow body comprises at least one of a soundproofing layer a semi-structural foam or a structural foam.

5. The floor according to claim 1, wherein the cavity is delimited by the lower floor and the upper floor.

6. The floor according to claim 1, wherein the floor comprises a shell, the lower floor comprising a lower face and an upper face, the upper face extending opposite the upper floor, the shell being fastened on the lower face, the cavity being delimited by the lower floor and by the shell.

7. The floor according to claim 6, wherein the shell is fastened to the lower floor by one or more removable mechanical fastening part(s).

8. The floor according to claim 6, wherein the shell is made from a metal or a composite material.

9. The floor according to claim 1, wherein the cavity comprises a fluidic communication member between the cavity and the exhaust line of the motor vehicle.

10. The floor according to claim 1, wherein the lower floor and the upper floor are glued, welded or assembled to one another by one or more fastening member(s).

11. A motor vehicle, comprising:
a chassis; and
a floor according to claim 1, rigidly fastened to the chassis.

\* \* \* \* \*